(12) United States Patent
Abolfathi et al.

(10) Patent No.: US 8,291,912 B2
(45) Date of Patent: Oct. 23, 2012

(54) SYSTEMS FOR MANUFACTURING ORAL-BASED HEARING AID APPLIANCES

(75) Inventors: Amir Abolfathi, Woodside, CA (US); Loc X. Phan, San Jose, CA (US)

(73) Assignee: Sonitus Medical, Inc., San Mateo, CA (US)

( * ) Notice: Subject to any disclaimer, the term of this patent is extended or adjusted under 35 U.S.C. 154(b) by 1407 days.

(21) Appl. No.: 11/841,477

(22) Filed: Aug. 20, 2007

(65) Prior Publication Data

US 2008/0070181 A1    Mar. 20, 2008

Related U.S. Application Data

(60) Provisional application No. 60/823,160, filed on Aug. 22, 2006.

(51) Int. Cl.
*A61B 19/00* (2006.01)

(52) U.S. Cl. .......................................... 128/898; 600/25

(58) Field of Classification Search ............ 600/25; 128/897, 898; 433/196, 213, 214, 223, 201.1; 264/16, 17, 19
See application file for complete search history.

(56) References Cited

U.S. PATENT DOCUMENTS

| | | | |
|---|---|---|---|
| 2,045,404 A | 6/1936 | Nicholides | |
| 2,161,169 A | 6/1939 | Jefferis | |
| 2,318,872 A | 5/1943 | Madiera | |
| 2,977,425 A | 3/1961 | Cole | |
| 2,995,633 A | 8/1961 | Puharich et al. | |
| 3,156,787 A | 11/1964 | Puharich et al. | |
| 3,170,993 A | 2/1965 | Puharich et al. | |
| 3,267,931 A | 8/1966 | Puharich et al. | |
| 3,325,743 A | 6/1967 | Blum | |
| 3,787,641 A | 1/1974 | Santori | |
| 3,894,196 A | 7/1975 | Briskey | |
| 3,985,977 A | 10/1976 | Beaty et al. | |
| 4,025,732 A | 5/1977 | Traunmuller | |
| 4,150,262 A | 4/1979 | Ono | |
| 4,498,461 A | 2/1985 | Hakansson | |
| 4,591,668 A | 5/1986 | Iwata | |
| 4,612,915 A | 9/1986 | Hough et al. | |
| 4,642,769 A | 2/1987 | Petrofsky | |
| 4,738,268 A | 4/1988 | Kipnis | |

(Continued)

FOREIGN PATENT DOCUMENTS

EP    0715838 A2    6/1996

(Continued)

OTHER PUBLICATIONS

"Special Forces Smart Noise Cancellation Ear Buds with Built-In GPS," http://www.gizmag.com/special-forces-smart-noise-cancellation-ear-buds-with-builtin-gps/9428/, 2 pages, 2008.

(Continued)

*Primary Examiner* — Samuel Gilbert
(74) *Attorney, Agent, or Firm* — Levine Bagade Han LLP

(57) ABSTRACT

Systems for manufacturing oral-based hearing aid appliances utilizing various manufacturing methods and apparatus are described herein. The oral appliance may have an electronic and/or transducer assembly for receiving incoming sounds and transmitting processed sounds via a vibrating transducer element coupled to a tooth or teeth. The oral appliance may be formed or fabricated via three-dimensional digital scanning systems or via impression molding to create a housing for the electronics and/or transducer assembly as well as to securely conform the appliance to the user's dentition.

17 Claims, 13 Drawing Sheets

U.S. PATENT DOCUMENTS

| | | |
|---|---|---|
| 4,817,044 A | 3/1989 | Ogren |
| 4,832,033 A | 5/1989 | Maher et al. |
| 4,920,984 A | 5/1990 | Furumichi et al. |
| 4,982,434 A | 1/1991 | Lenhardt et al. |
| 5,012,520 A | 4/1991 | Steeger |
| 5,033,999 A | 7/1991 | Mersky |
| 5,047,994 A | 9/1991 | Lenhardt et al. |
| 5,060,526 A | 10/1991 | Barth et al. |
| 5,082,007 A | 1/1992 | Adell |
| 5,233,987 A | 8/1993 | Fabian et al. |
| 5,323,468 A | 6/1994 | Bottesch |
| 5,325,436 A | 6/1994 | Soli et al. |
| 5,372,142 A | 12/1994 | Madsen et al. |
| 5,402,496 A | 3/1995 | Soli et al. |
| 5,403,262 A | 4/1995 | Gooch |
| 5,447,489 A | 9/1995 | Issalene et al. |
| 5,455,842 A | 10/1995 | Mersky et al. |
| 5,460,593 A | 10/1995 | Mersky et al. |
| 5,546,459 A | 8/1996 | Sih et al. |
| 5,558,618 A | 9/1996 | Maniglia |
| 5,565,759 A | 10/1996 | Dunstan |
| 5,616,027 A | 4/1997 | Jacobs et al. |
| 5,624,376 A | 4/1997 | Ball et al. |
| 5,661,813 A | 8/1997 | Shimauchi et al. |
| 5,706,251 A | 1/1998 | May |
| 5,760,692 A | 6/1998 | Block |
| 5,800,336 A | 9/1998 | Ball et al. |
| 5,812,496 A | 9/1998 | Peck |
| 5,828,765 A | 10/1998 | Gable |
| 5,902,167 A | 5/1999 | Filo et al. |
| 5,914,701 A | 6/1999 | Gersheneld et al. |
| 5,961,443 A | 10/1999 | Rastatter et al. |
| 5,984,681 A | 11/1999 | Huang |
| 6,029,558 A | 2/2000 | Stevens et al. |
| 6,047,074 A | 4/2000 | Zoels et al. |
| 6,068,590 A | 5/2000 | Brisken |
| 6,072,884 A | 6/2000 | Kates |
| 6,072,885 A | 6/2000 | Stockham, Jr. et al. |
| 6,075,557 A | 6/2000 | Holliman et al. |
| 6,115,477 A | 9/2000 | Filo et al. |
| 6,118,882 A | 9/2000 | Haynes |
| 6,171,229 B1 | 1/2001 | Kroll et al. |
| 6,223,018 B1 | 4/2001 | Fukumoto et al. |
| 6,239,705 B1 | 5/2001 | Glen |
| 6,333,269 B2 | 12/2001 | Naito et al. |
| 6,377,693 B1 | 4/2002 | Lippa et al. |
| 6,394,969 B1 | 5/2002 | Lenhardt |
| 6,504,942 B1 | 1/2003 | Hong et al. |
| 6,538,558 B2 | 3/2003 | Sakazume et al. |
| 6,585,637 B2 | 7/2003 | Brillhart et al. |
| 6,631,197 B1 | 10/2003 | Taenzer |
| 6,633,747 B1 | 10/2003 | Reiss |
| 6,682,472 B1 | 1/2004 | Davis |
| 6,754,472 B1 | 6/2004 | Williams et al. |
| 6,778,674 B1 | 8/2004 | Panasik et al. |
| 6,826,284 B1 | 11/2004 | Benesty et al. |
| 6,885,753 B2 | 4/2005 | Bank |
| 6,917,688 B2 | 7/2005 | Yu et al. |
| 6,941,952 B1 | 9/2005 | Rush, III |
| 6,954,668 B1 | 10/2005 | Cuozzo |
| 6,985,599 B2 | 1/2006 | Asnes |
| 7,003,099 B1 | 2/2006 | Zhang et al. |
| 7,033,313 B2 | 4/2006 | Lupin et al. |
| 7,035,415 B2 | 4/2006 | Belt et al. |
| 7,074,222 B2 | 7/2006 | Westerkull |
| 7,076,077 B2 | 7/2006 | Atsumi et al. |
| 7,099,822 B2 | 8/2006 | Zangi |
| 7,162,420 B2 | 1/2007 | Zangi et al. |
| 7,171,003 B1 | 1/2007 | Venkatesh et al. |
| 7,171,008 B2 | 1/2007 | Elko |
| 7,174,022 B1 | 2/2007 | Zhang et al. |
| 7,206,423 B1 | 4/2007 | Feng et al. |
| 7,246,058 B2 | 7/2007 | Burnett |
| 7,258,533 B2 | 8/2007 | Tanner et al. |
| 7,269,266 B2 | 9/2007 | Anjanappa et al. |
| 7,271,569 B2 | 9/2007 | Oglesbee |
| 7,310,427 B2 | 12/2007 | Retchin et al. |
| 7,329,226 B1 | 2/2008 | Ni et al. |
| 7,331,349 B2 | 2/2008 | Brady et al. |
| 7,333,624 B2 | 2/2008 | Husung |
| 7,361,216 B2 | 4/2008 | Kangas et al. |
| 7,409,070 B2 | 8/2008 | Pitulia |
| 7,486,798 B2 | 2/2009 | Anjanappa et al. |
| 7,520,851 B2 | 4/2009 | Davis et al. |
| 7,522,738 B2 | 4/2009 | Miller, III |
| 7,522,740 B2 | 4/2009 | Julstrom et al. |
| 8,043,091 B2 * | 10/2011 | Schmitt ..................... 433/196 |
| 2001/0003788 A1 | 6/2001 | Ball et al. |
| 2001/0051776 A1 | 12/2001 | Lenhardt |
| 2002/0026091 A1 | 2/2002 | Leysieffer |
| 2002/0071581 A1 | 6/2002 | Leysieffer et al. |
| 2002/0077831 A1 | 6/2002 | Numa |
| 2002/0122563 A1 | 9/2002 | Schumaier |
| 2002/0173697 A1 | 11/2002 | Lenhardt |
| 2003/0059078 A1 | 3/2003 | Downs et al. |
| 2003/0091200 A1 | 5/2003 | Pompei |
| 2003/0212319 A1 | 11/2003 | Magill |
| 2004/0057591 A1 | 3/2004 | Beck et al. |
| 2004/0131200 A1 | 7/2004 | Davis |
| 2004/0141624 A1 | 7/2004 | Davis et al. |
| 2004/0202339 A1 | 10/2004 | O'Brien, Jr. et al. |
| 2004/0202344 A1 | 10/2004 | Anjanappa et al. |
| 2004/0243481 A1 | 12/2004 | Bradbury et al. |
| 2004/0247143 A1 | 12/2004 | Lantrua et al. |
| 2005/0037312 A1 | 2/2005 | Uchida |
| 2005/0067816 A1 | 3/2005 | Buckman |
| 2005/0070782 A1 | 3/2005 | Brodkin |
| 2005/0129257 A1 | 6/2005 | Tamura |
| 2005/0196008 A1 | 9/2005 | Anjanappa et al. |
| 2005/0241646 A1 | 11/2005 | Sotos et al. |
| 2006/0008106 A1 | 1/2006 | Harper |
| 2006/0025648 A1 | 2/2006 | Lupin et al. |
| 2006/0064037 A1 | 3/2006 | Shalon et al. |
| 2006/0167335 A1 | 7/2006 | Park et al. |
| 2006/0270467 A1 | 11/2006 | Song et al. |
| 2006/0275739 A1 | 12/2006 | Ray |
| 2007/0010704 A1 | 1/2007 | Pitulia |
| 2007/0036370 A1 | 2/2007 | Granovetter et al. |
| 2007/0041595 A1 | 2/2007 | Carazo et al. |
| 2007/0142072 A1 | 6/2007 | Lassally |
| 2007/0230713 A1 | 10/2007 | Davis |
| 2007/0242835 A1 | 10/2007 | Davis |
| 2007/0265533 A1 | 11/2007 | Tran |
| 2007/0276270 A1 | 11/2007 | Tran |
| 2007/0280491 A1 | 12/2007 | Abolfathi |
| 2007/0280492 A1 | 12/2007 | Abolfathi |
| 2007/0280493 A1 | 12/2007 | Abolfathi |
| 2007/0280495 A1 | 12/2007 | Abolfathi |
| 2007/0286440 A1 | 12/2007 | Abolfathi et al. |
| 2007/0291972 A1 | 12/2007 | Abolfathi et al. |
| 2008/0019542 A1 | 1/2008 | Menzel et al. |
| 2008/0019557 A1 | 1/2008 | Bevirt et al. |
| 2008/0021327 A1 | 1/2008 | El-Bialy et al. |
| 2008/0064993 A1 | 3/2008 | Abolfathi et al. |
| 2008/0304677 A1 | 12/2008 | Abolfathi et al. |
| 2009/0028352 A1 | 1/2009 | Petroff |
| 2009/0052698 A1 | 2/2009 | Rader et al. |
| 2009/0088598 A1 | 4/2009 | Abolfathi |
| 2009/0097684 A1 | 4/2009 | Abolfathi et al. |
| 2009/0097685 A1 | 4/2009 | Menzel et al. |
| 2009/0099408 A1 | 4/2009 | Abolfathi et al. |
| 2009/0105523 A1 | 4/2009 | Kassayan et al. |
| 2009/0147976 A1 | 6/2009 | Abolfathi |
| 2009/0149722 A1 | 6/2009 | Abolfathi et al. |
| 2009/0180652 A1 | 7/2009 | Davis et al. |

FOREIGN PATENT DOCUMENTS

| | | |
|---|---|---|
| EP | 0741940 A1 | 11/1996 |
| EP | 0824889 A1 | 2/1998 |
| EP | 1299052 A1 | 2/2002 |
| EP | 1633284 A1 | 12/2004 |
| EP | 1691686 A1 | 8/2006 |
| EP | 1718255 A1 | 11/2006 |
| EP | 1783919 A1 | 5/2007 |
| JP | 2007028248 A2 | 2/2007 |
| JP | 2007028610 A2 | 2/2007 |
| JP | 2007044284 A2 | 2/2007 |

| | | |
|---|---|---|
| JP | 2007049599 A2 | 2/2007 |
| JP | 2007049658 A2 | 2/2007 |
| WO | WO 83/02047 | 6/1983 |
| WO | WO 91/02678 | 3/1991 |
| WO | WO 95/19678 | 7/1995 |
| WO | WO 96/21335 | 7/1996 |
| WO | WO 02/09622 | 2/2002 |
| WO | WO 2004/045242 | 5/2004 |
| WO | WO 2004/105650 | 12/2004 |
| WO | WO 2005/000391 | 1/2005 |
| WO | WO 2005/037153 | 4/2005 |
| WO | WO 2005/053533 | 6/2005 |
| WO | WO 2006/088410 | 8/2006 |
| WO | WO 2006/130909 | 12/2006 |
| WO | WO 2007/043055 | 4/2007 |
| WO | WO 2007/052251 | 5/2007 |
| WO | WO 2007/059185 | 5/2007 |
| WO | WO 2007/140367 | 12/2007 |
| WO | WO 2007/140368 | 12/2007 |
| WO | WO 2007/140373 | 12/2007 |
| WO | WO 2007/143453 | 12/2007 |
| WO | WO 2008/024794 | 2/2008 |
| WO | WO 2008/030725 | 3/2008 |
| WO | WO 2009/014812 | 1/2009 |
| WO | WO 2009/025917 | 2/2009 |
| WO | WO 2009/066296 | 5/2009 |

OTHER PUBLICATIONS

Altmann, et al. Foresighting the new technology waves—Exper Group. In: State of the Art Reviews and Related Papers—Center on Nanotechnology and Society. 2004 Conference. Published Jun. 14, 2004. p. 1-291. Available at http://www.nano-and-society.org.

Berard, G., "Hearing Equals Behavior" [summary], 1993, http://www.bixby.org/faq/tinnitus/treatment.html.

Broyhill, D., "Battlefield Medical Information System—Telemedicine," A research paper presented to the U.S. Army Command and General Staff College in partial Fulfillment of the requirement for A462 Combat Health Support Seminar, 12 pages, 2003.

Dental Cements—Premarket Notification, U.S. Department of Health and Human Services Food and Drug Administration Center for Devices and Radiological Health, pp. 1-10, Aug. 18, 1998.

Henry, et al. "Comparison of Custom Sounds for Achieving Tinnitus Relief, " *J Am Acad Audiol*,15:585○598, 2004.

Jastreboff, Pawel, J., "Phantom auditory perception (tinnitus): mechanisms of generation and perception," *Neuroscience Research*, 221-254, 1990, Elsevier Scientific Publishers Ireland, Ltd.

Robb, "Tinnitus Device Directory Part I," *Tinnitus Today*, p. 22, Jun. 2003.

Song, S. et al., "A 0.2-mW 2-Mb/s Digital Transceiver Based on Wideband Signaling for Human Body Communications," *IEEE J Solid-State Cir*, 42(9), 2021-2033, Sep. 2007.

Stuart, A., et al., "Investigations of the Impact of Altered Auditory Feedback In-The-Ear Devices on the Speech of People Who Stutter: Initial Fitting and 4-Month Follow-Up," *Int J Lang Commun Disord*, 39(1), Jan. 2004, [abstract only].

U.S. Appl. No. 11/672,264, filed Feb. 7, 2007 in the name of Abolfathi, Non-Final Rejection mailed Apr. 28, 2009.

U.S. Appl. No. 11/672,264, filed Feb. 7, 2007 in the name of Abolfathi, Non-Final Rejection mailed Aug. 6, 2008.

U.S. Appl. No. 11/672,239, filed Feb. 7, 2007, in the name of Abolfathi, Non-final Office Action mailed Jun. 18, 2009.

U.S. Appl. No. 11/672,239, filed Feb. 7, 2007 in the name of Abolfathi, Non-final Office Action mailed Nov. 13, 2008.

U.S. Appl. No. 11/672,250, filed Feb. 7, 2007 in the name of Abolfathi, Non-final Office Action mailed Apr. 21, 2009.

U.S. Appl. No. 11/672,250, filed Feb. 7, 2007 in the name of Abolfathi, Non-final Office Action mailed Aug. 8, 2008.

U.S. Appl. No. 11/672,271, filed Feb. 7, 2007 in the name of Abolfathi, Final Office Action mailed May 18, 2009.

U.S. Appl. No. 11/672,271, filed Feb. 7, 2007 in the name of Abolfathi, Non-final Office Action mailed Aug. 20, 2008.

U.S. Appl. No. 11/741,648, filed Apr. 27, 2007 in the name of Menzel et al., Final Office Action mailed May 18, 2009.

U.S. Appl. No. 11/741,648, filed Apr. 27, 2007 in the name of Menzel et al., Non-final Office Action mailed Sep. 4, 2008.

U.S. Appl. No. 11/754,82, filed May 29, 2007 in the name of Abolfathi et al., Final Office Action mailed May 12, 2009.

U.S. Appl. No. 11/754,823, filed May 29, 2007 in the name of Abolfathi et al., Non-final Office Action mailed Aug. 14, 2008.

U.S. Appl. No. 11/754,833, filed May 29, 2007 in the name of Abolfathi et al., Final Office Action mailed May 14, 2009.

U.S. Appl. No. 11/754,833, filed May 29, 2007 in the name of Abolfathi et al., Non-final Office Action mailed Aug. 6, 2008.

U.S. Appl. No. 11/866,345, filed May 29, 2007 in the name of Abolfathi et al., Final Office Action mailed Apr. 15, 2009.

U.S. Appl. No. 11/866,345, filed May 29, 2007 in the name of Abolfathi et al., Non-final Office Action mailed Mar. 19, 2008.

Wen, Y. et al, "Online Prediction of Battery Lifetime for Embedded and Mobile Devices," Special Issue on Embedded Systems: Springer-Verlag Heidelberg Lecture Notes in Computer Science, V3164/2004, 15 pages, Dec. 2004.

* cited by examiner

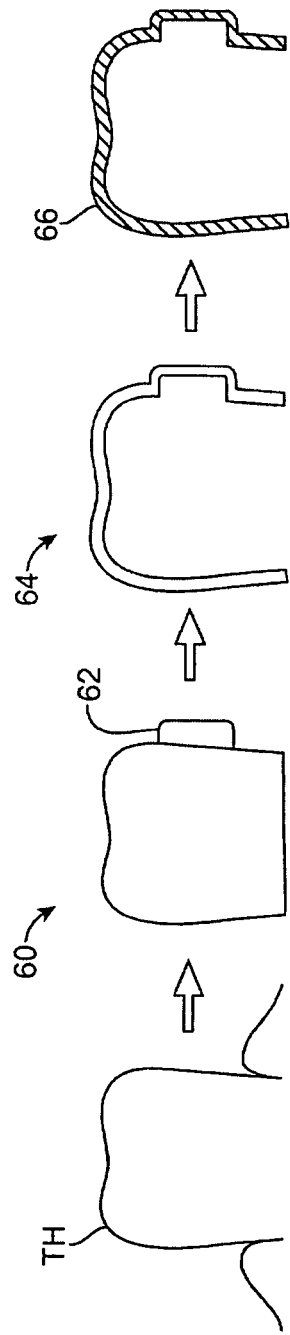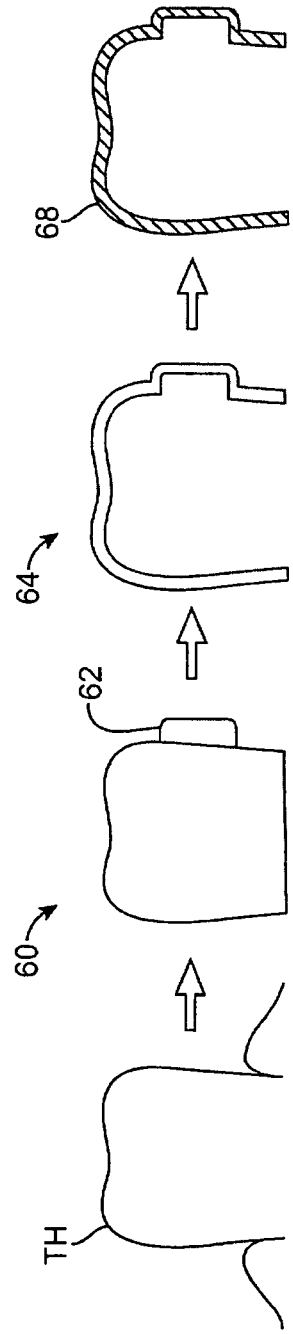

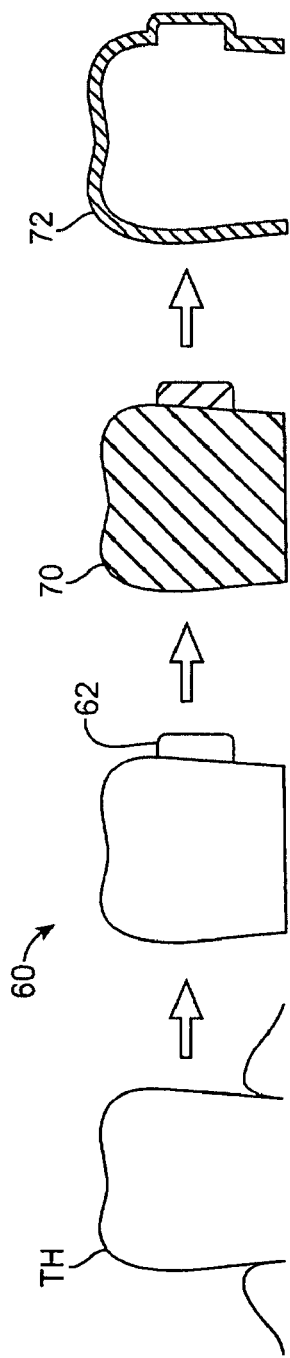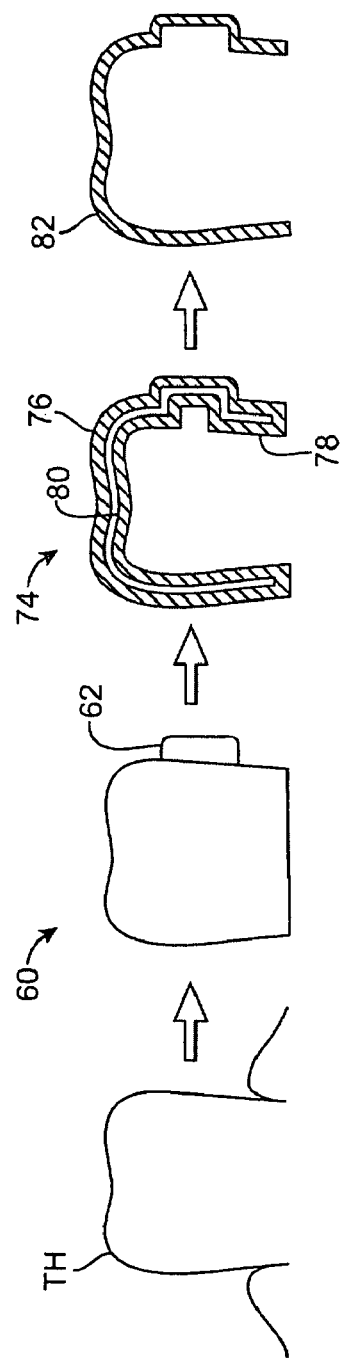

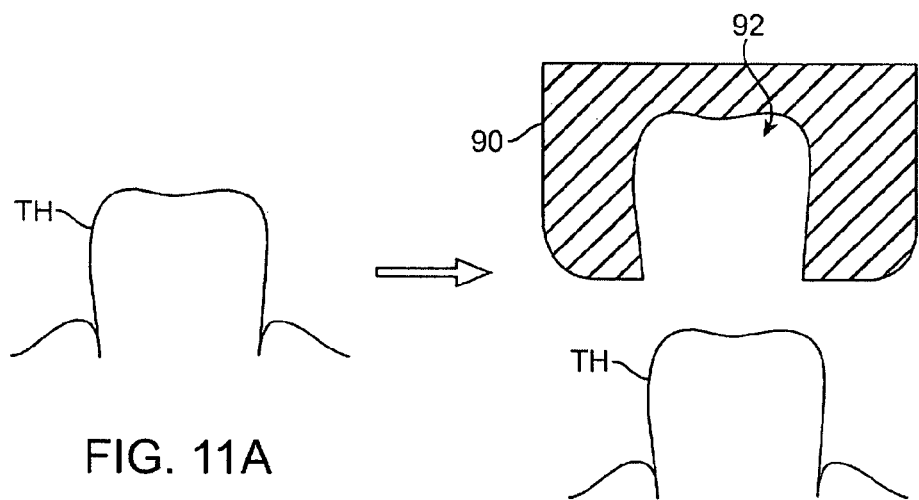
FIG. 11A
FIG. 11B
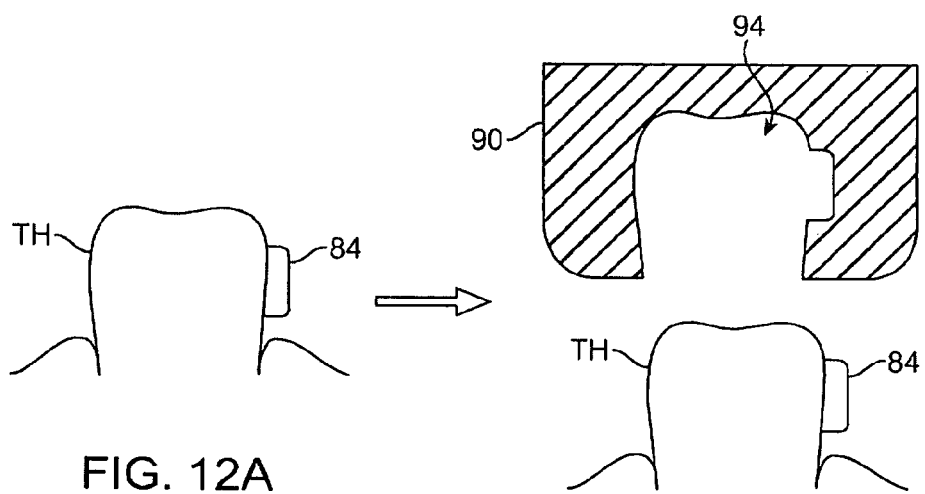
FIG. 12A
FIG. 12B

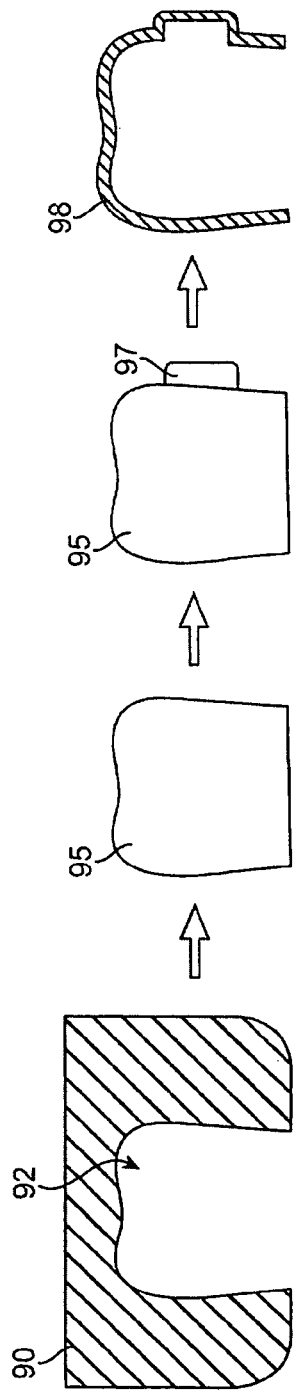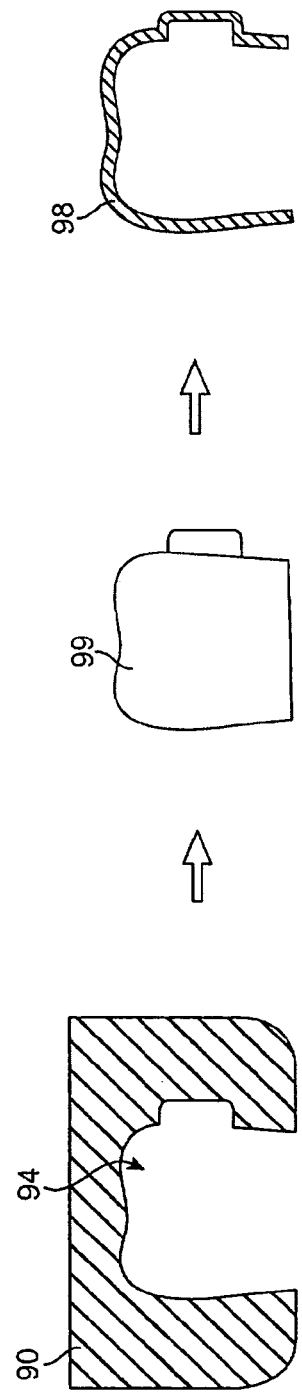

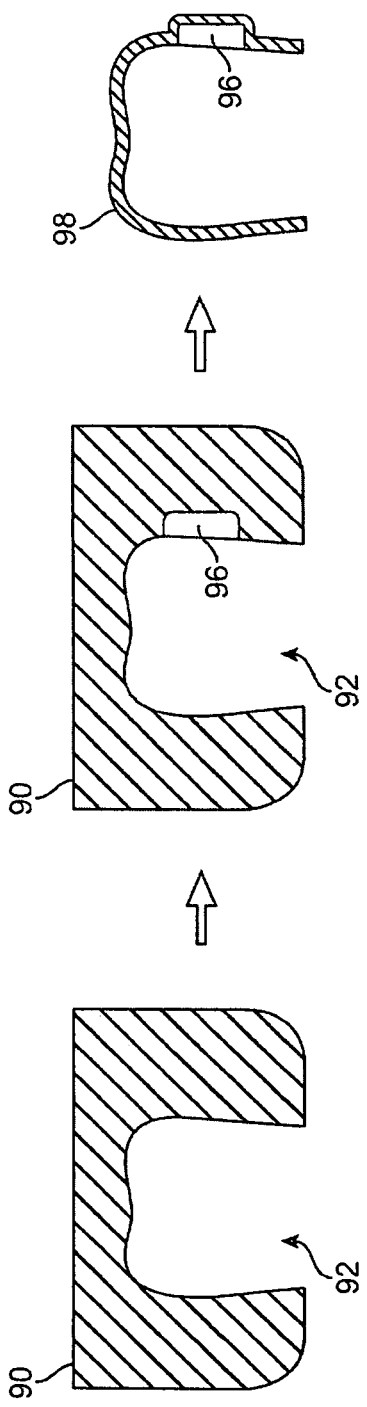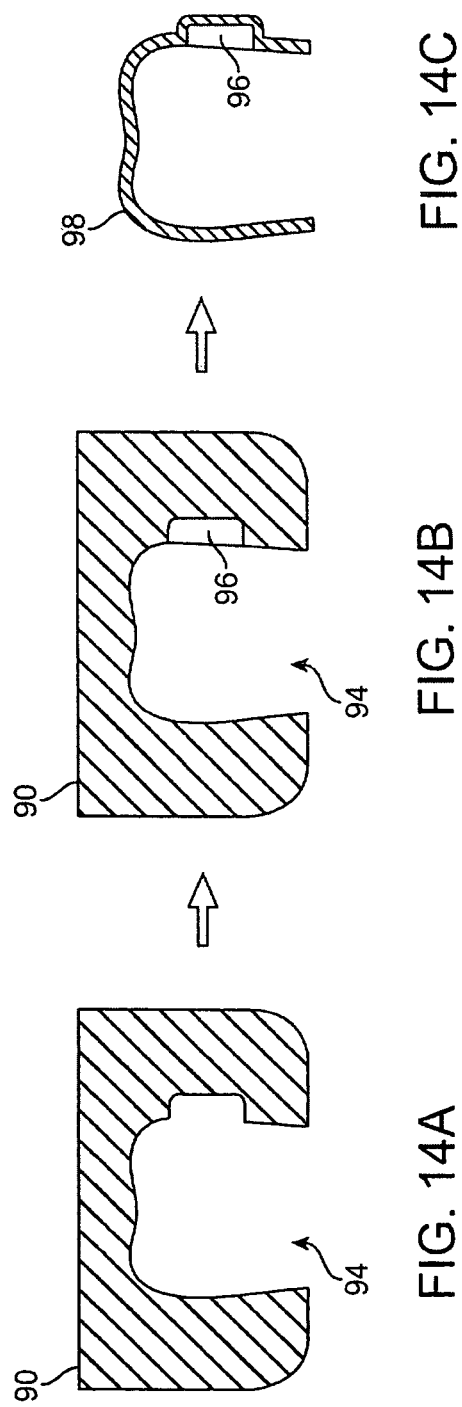

SYSTEMS FOR MANUFACTURING ORAL-BASED HEARING AID APPLIANCES

CROSS-REFERENCE TO RELATED APPLICATIONS

This application claims the benefit of priority to U.S. Provisional Patent Application Ser. No. 60/823,160 filed Aug. 22, 2006, the content of which is incorporated herein by reference in its entirety.

FIELD OF THE INVENTION

The present invention relates to systems for manufacturing oral-based hearing aid appliances. More particularly, the present invention relates to systems for manufacturing oral appliances which are positionable within a cavity of a patient, such as the oral cavity, for enhancing sound conduction through teeth or bone structures in and/or around the mouth to enable a user to receive auditory signals.

BACKGROUND OF THE INVENTION

Hearing loss affects over 31 million people in the United States (about 13% of the population). As a chronic condition, the incidence of hearing impairment rivals, that of heart disease and, like heart disease, the incidence of hearing impairment increases sharply with age.

While the vast majority of those with hearing loss can be helped by a well-fitted, high quality hearing device, only 22% of the total hearing impaired population own hearing devices. Current products and distribution methods are not able to satisfy or reach over 20 million persons with hearing impairment in the U.S. alone.

Hearing loss adversely affects a person's quality of life and psychological well-being. Individuals with hearing impairment often withdraw from social interactions to avoid frustrations resulting from inability to understand conversations. Recent studies have shown that hearing impairment causes increased stress levels, reduced self-confidence, reduced sociability and reduced effectiveness in the workplace.

The human ear generally comprises three regions: the outer ear, the middle ear, and the inner ear. The outer ear generally comprises the external auricle and the ear canal, which is a tubular pathway through which sound reaches the middle ear. The outer ear is separated from the middle ear by the tympanic membrane (eardrum). The middle ear generally comprises three small bones, known as the ossicles, which form a mechanical conductor from the tympanic membrane to the inner ear. Finally, the inner ear includes the cochlea, which is a fluid-filled structure that contains a large number of delicate sensory hair cells that are connected to the auditory nerve.

Hearing loss can also be classified in terms of being conductive, sensorineural, or a combination of both. Conductive hearing impairment typically results from diseases or disorders that limit the transmission of sound through the middle ear. Most conductive impairments can be treated medically or surgically. Purely conductive hearing loss represents a relatively small portion of the total hearing impaired population (estimated at less than 5% of the total hearing impaired population).

Sensorineural, hearing losses occur mostly in the inner ear and account for the vast majority of hearing impairment (estimated at 90-95% of the total hearing impaired population). Sensorineural hearing impairment (sometimes called "nerve loss") is largely caused by damage to the sensory hair cells inside the cochlea. Sensorineural hearing impairment occurs naturally as a result of aging or prolonged exposure to loud music and noise. This type of hearing loss cannot be reversed nor can it be medically or surgically treated; however, the use of properly fitted hearing devices can improve the individual's quality of life.

Conventional hearing devices are the most common devices used to treat mild to severe sensorineural hearing impairment. These are acoustic devices that amplify sound to the tympanic membrane. These devices are individually customizable to the patient's physical and acoustical characteristics over four to six separate visits to an audiologist or hearing instrument specialist. Such devices generally comprise a microphone, amplifier, battery, and speaker. Recently, hearing device manufacturers have increased the sophistication of sound processing, often using digital technology, to provide features such as programmability and multi-band compression. Although these devices have been miniaturized and are less obtrusive, they are still visible and have major acoustic limitation.

Industry research has shown that the primary obstacles for not purchasing a hearing device generally include: a) the stigma associated with wearing a hearing device; b) dissenting attitudes on the part of the medical profession, particularly ENT physicians; c) product value issues related to perceived performance problems; d) general lack of information and education at the consumer and physician level; and e) negative word-of-mouth from dissatisfied users.

Other devices such as cochlear implants have been developed for people who have severe to profound hearing loss and are essentially deaf (approximately 2%, of the total hearing impaired population). The electrode of a cochlear implant is inserted into the inner ear in an invasive and non-reversible surgery. The electrode electrically stimulates the auditory nerve through an electrode array that provides audible cues to the user, which are not usually interpreted by the brain as normal sound. Users generally require intensive and extended counseling and training following surgery to achieve the expected benefit.

Other devices such as electronic middle ear implants generally are surgically placed within the middle ear of the hearing impaired. They are surgically implanted devices with an externally worn component.

The manufacture, fitting and dispensing of hearing devices remain an arcane and inefficient process. Most hearing devices are custom manufactured, fabricated by the manufacturer to fit the ear of each prospective purchaser. An impression of the ear canal is taken by the dispenser (either an audiologist or licensed hearing instrument specialist) and mailed to the manufacturer for interpretation and fabrication of the custom molded rigid plastic casing. Hand-wired electronics and transducers (microphone and speaker) are then placed inside the casing, and the final product is shipped back to the dispensing professional after some period of time, typically one to two weeks.

The time cycle for dispensing a hearing device, from the first diagnostic session to the final fine-tuning session, typically spans a period over several weeks, such as six to eight weeks, and involves multiple with the dispenser.

Accordingly, there exists a need for methods and devices for efficiently manufacturing oral-based hearing aid appliances for facilitating the treatment of hearing loss in patients.

SUMMARY OF THE INVENTION

An electronic and transducer device may be attached, adhered, or otherwise embedded into or upon a removable dental or oral appliance to form a hearing aid assembly. Such a removable oral appliance may be a custom-made device fabricated from a thermal forming process utilizing a replicate model of a dental structure obtained by conventional dental impression methods. The electronic and transducer assembly may receive incoming sounds either directly or through a receiver to process and amplify the signals and transmit the processed sounds via a vibrating transducer element coupled to a tooth or other bone structure such as the maxillary, mandibular, or palatine bone structure. Alternatively and/or additionally the vibrating transducer element may transmit the processed sounds via other routes such as underlying cartilage tissue or other implantable structures.

The assembly for transmitting vibrations via at least one tooth may generally comprise a housing having a shape which is conformable to at least a portion of the at least one tooth, and an actuatable transducer disposed within or upon the housing and in vibratory communication with a surface of the at least one tooth.

In fabricating or manufacturing such an oral appliance, the appliance may generally conform closely to the patient's dentition such that intimate contact between the transducer and the surface of the at least one tooth is securely maintained. Despite the secure contact, patient comfort is ideally maintained as well. Accordingly, one method for fabricating the oral appliance may generally comprise scanning at least the portion of the dentition such that a corresponding three-dimensional image is created, manipulating the image such that the housing for the electronics and/or transducer assembly is positioned along a side surface of the dentition, and forming the oral appliance having the housing portion from the image whereby the oral appliance is conformable to the portion of dentition.

Another method for fabricating the oral appliance may generally comprise adhering the housing along the side surface of the portion of dentition, scanning at least the portion of the dentition having the housing such that a corresponding three-dimensional image is created, and forming the oral appliance having the housing portion from the image whereby the oral appliance is conformable to the portion of dentition.

Yet another method for fabricating the oral appliance may generally comprise providing a dental tray sized to cover at least the portion of the patient's dentition, wherein the dental tray defines the housing, filling a channel defined along the dental tray with a settable polymer, placing at least the portion of the patient's dentition within the channel such that the polymer conforms to a shape of the dentition until the polymer hardens, and removing the dental tray from the hardened polymer.

The oral appliance can be used in a variety of applications, including hearing aid applications. The appliance can also be used in general sound transmission for medical and communication applications such as treating tinnitus, treating stuttering problem. The appliance can communicate through cellular and Bluetooth to provide one-way or two-way communications, among others. The appliance can also be used to store personally identifiable medical information for certain military or medical identification purposes.

BRIEF DESCRIPTION OF THE DRAWINGS

FIGS. 6A to 6D illustrate one method for forming the oral appliance by scanning a digital image of the dentition, manipulating the digital image, and generating the oral appliance via any number of three-dimensional printing methods.

FIGS. 7A to 7D illustrate another method for forming the oral appliance by scanning a digital image of the dentition, manipulating the digital image, and generating the oral appliance via any number of machining methods.

FIGS. 8A to 8D illustrate another method for forming the oral appliance by scanning a digital image of the dentition, manipulating the digital image, and generating the oral appliance by creating a physical replica of the dentition for thermal forming.

FIGS. 9A to 9D illustrate yet another method for forming the oral appliance by scanning a digital image of the dentition, manipulating the digital image, and generating the oral appliance via an injectable mold.

FIGS. 11A and 11B illustrate yet another method utilizing the creation of a direct impression of the dentition via a mold.

FIGS. 11C to 11F illustrate one method for utilizing a mold or model formed from a direct impression of the dentition to thermally form an oral appliance thereupon.

FIGS. 12A and 12B illustrate yet another method utilizing a direct impression of the dentition having a housing adhered thereto.

FIGS. 12C to 12E illustrate another method for utilizing a mold or model having a housing formed therein created from a direct impression of the dentition to thermally form an oral appliance thereupon.

FIGS. 13A to 13C illustrate yet another method where the impression may have a housing formed therein prior to forming the oral appliance.

FIGS. 14A to 14C illustrate yet another method where the electronics and/or transducer assembly may be integrated with the impression.

DETAILED DESCRIPTION OF THE INVENTION

An electronic and transducer device may be attached, adhered or otherwise embedded into or upon a removable oral appliance or other oral device to form a hearing aid assembly. Such an oral appliance may be a custom-made device fabricated through a variety of different process utilizing, e.g., a replicate model of a dental structure obtained by any number of methods, as described below in further detail. The oral appliance may accordingly be created to fit, adhere, or be otherwise disposed upon a portion of the patient's dentition to maintain the electronics and transducer device against the patient's dentition securely and comfortably.

The electronic and transducer assembly may receive incoming sounds either directly or through a receiver to process and amplify the signals and transmit the processed sounds via a vibrating transducer element coupled to a tooth or other bone structure, such as the maxillary, mandibular, or palatine bone structure.

Figure 1:
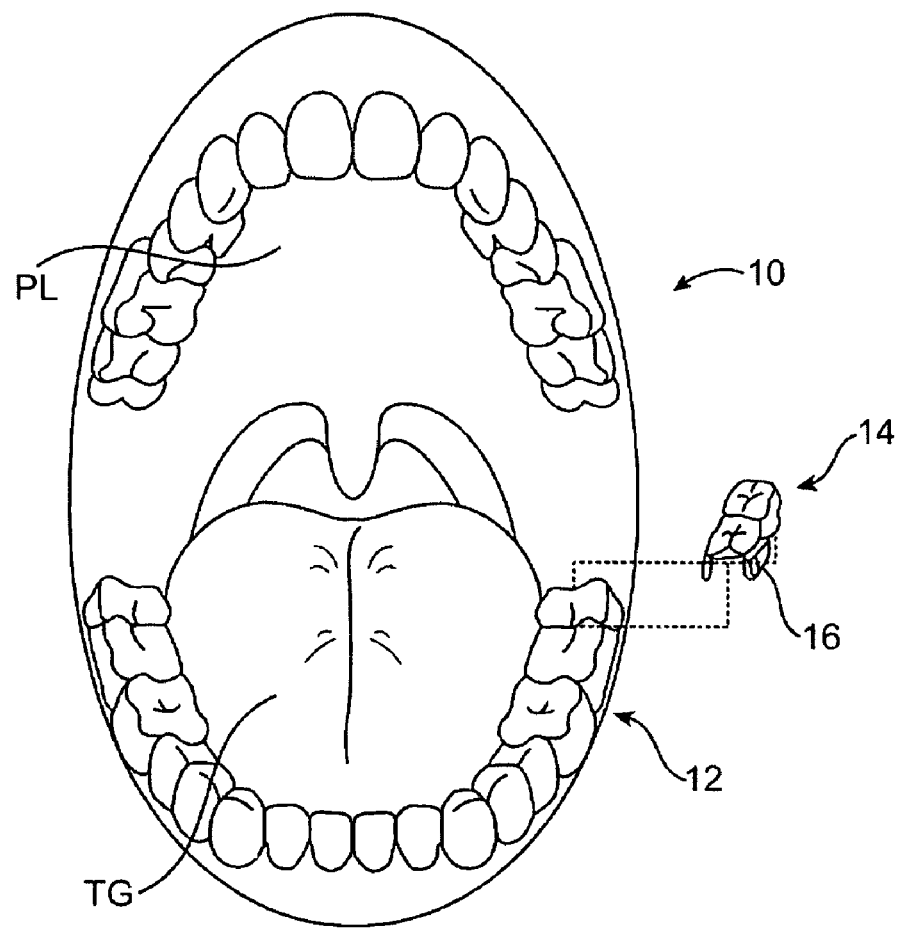
FIG. 1 illustrates the dentition of a patient's teeth and one variation of a hearing aid device which is removably placed upon or against the patient's tooth or teeth as a removable oral appliance.

As shown in FIG. 1, a patient's mouth and dentition 10 is illustrated showing one possible location for removably attaching hearing aid assembly 14 upon or against at least one tooth, such as a molar 12. The patient's tongue TG and palate PL are also illustrated for reference. An electronics and/or transducer assembly 16 may be attached, adhered, or otherwise embedded into or upon the assembly 14, as described below in further detail.

Figure 2A:
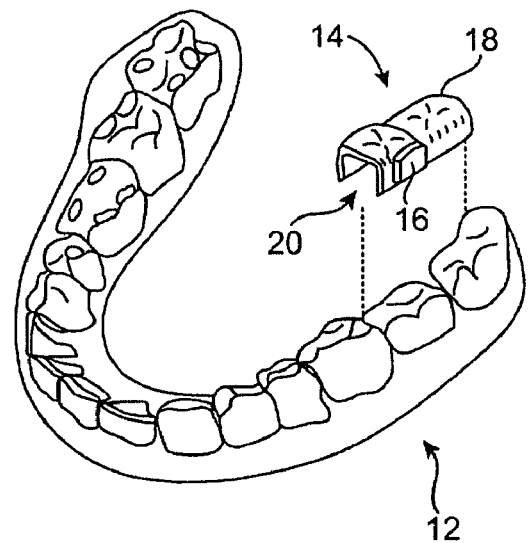
FIG. 2A illustrates a perspective view of the lower teeth showing one exemplary location for placement of the removable oral appliance hearing aid device.

FIG. 2A shows a perspective view of the patient's lower dentition illustrating the hearing aid assembly 14 comprising a removable oral appliance 18 and the electronics and/or transducer assembly 16 positioned along a side surface of the assembly 14. In this variation, oral appliance 18 may be fitted upon two molars 12 within tooth engaging channel 20 defined by oral appliance 18 for stability upon the patient's teeth, although in other variations, a single molar or tooth may be utilized. Alternatively, more than two molars may be utilized for the oral appliance 18 to be attached upon or over. Moreover, electronics and/or transducer assembly 16 is shown positioned upon a side surface of oral appliance 18 such that the assembly 16 is aligned along a buccal surface of the tooth 12; however, other surfaces such as the lingual surface of the tooth 12 and other positions may also be utilized. The figures are illustrative of variations and are not intended to be limiting; accordingly, other configurations and shapes for oral appliance 18 are intended to be included herein.

Figure 2B:
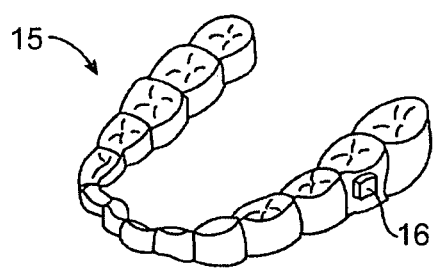
FIG. 2B illustrates another variation of the removable oral appliance in the form of an appliance which is placed over an entire row of teeth in the manner of a mouthguard.

FIG. 2B shows another variation of a removable oral appliance in the form of an appliance 15 which is placed over an entire row of teeth in the manner of a mouthguard. In this variation, appliance 15 may be configured to cover an entire bottom row of teeth or alternatively an entire upper row of teeth. In additional variations, rather than covering the entire rows of teeth, a majority of the row of teeth may be instead be covered by appliance 15. Assembly 16 may be positioned along one or more portions of the oral appliance 15.

Figure 2C:
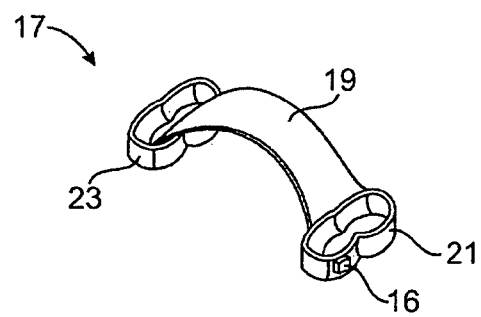
FIG. 2C illustrates another variation of the removable oral appliance which is supported by an arch.

FIG. 2C shows yet another variation of an oral appliance 17 having an arched configuration. In this appliance, one or more tooth retaining portions 21, 23, which in this variation may be placed along the upper row of teeth, may be supported by an arch 19 which may lie adjacent or along the palate of the user. As shown, electronics and/or transducer assembly 16 may be positioned along one or more portions of the tooth retaining portions 21, 23. Moreover, although the variation shown illustrates an arch 19 which may cover only a portion of the palate of the user, other variations may be configured to have an arch which covers the entire palate of the user.

Figure 2D:
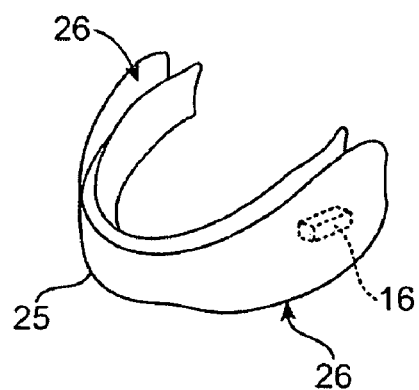
FIG. 2D illustrates another variation of an oral appliance configured as a mouthguard.

FIG. 2D illustrates yet another variation of an oral appliance in the form of a mouthguard or retainer 25 which may be inserted and removed easily from the user's mouth. Such a mouthguard or retainer 25 may be used in sports where conventional mouthguards are worn; however, mouthguard or retainer 25 having assembly 16 integrated therein may be utilized by persons, hearing impaired or otherwise, who may simply hold the mouthguard or retainer 25 via grooves or channels 26 between their teeth for receiving instructions remotely and communicating over a distance.

Generally, the volume of electronics and/or transducer assembly 16 may be minimized so as to be unobtrusive and as comfortable to the user when placed in the mouth. Although the size may be varied, a volume of assembly 16 may be less than 800 cubic millimeters. This volume is, of course, illustrative and not limiting as size and volume of assembly 16 and may be varied accordingly between different users.

Figure 3:
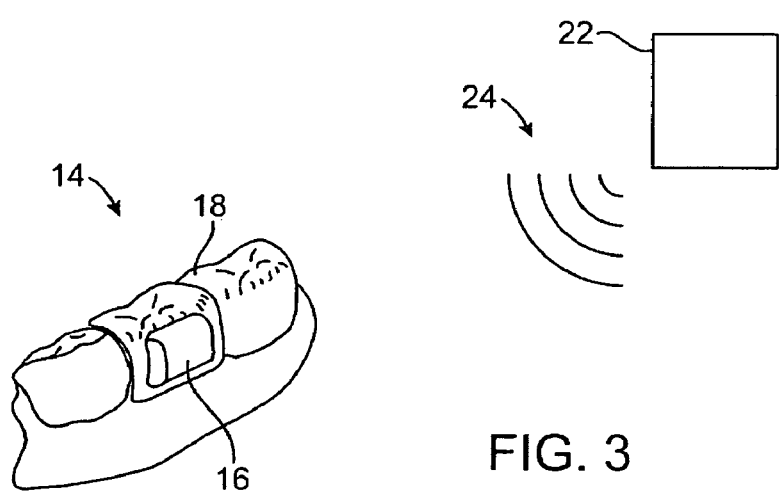
FIG. 3 illustrates a detail perspective view of the oral appliance positioned upon the patient's teeth utilizable in combination with a transmitting assembly external to the mouth and wearable by the patient in another variation of the device.

In one variation, with assembly 14 positioned upon the teeth, as shown in FIG. 3, an extra-buccal transmitter assembly 22 located outside the patient's mouth may be utilized to receive auditory signals for processing and transmission via a wireless signal 24 to the electronics and/or transducer assembly 16 positioned within the patient's mouth, which may then process and transmit the processed auditory signals via vibratory conductance to the underlying tooth and consequently to the patient's inner ear.

The transmitter assembly 22, as described in further detail below, may contain a microphone assembly as welt as a transmitter assembly and may be configured in any number of shapes and forms worn by the user, such as a watch, necklace, lapel, phone, belt-mounted device, etc.

Figure 4:
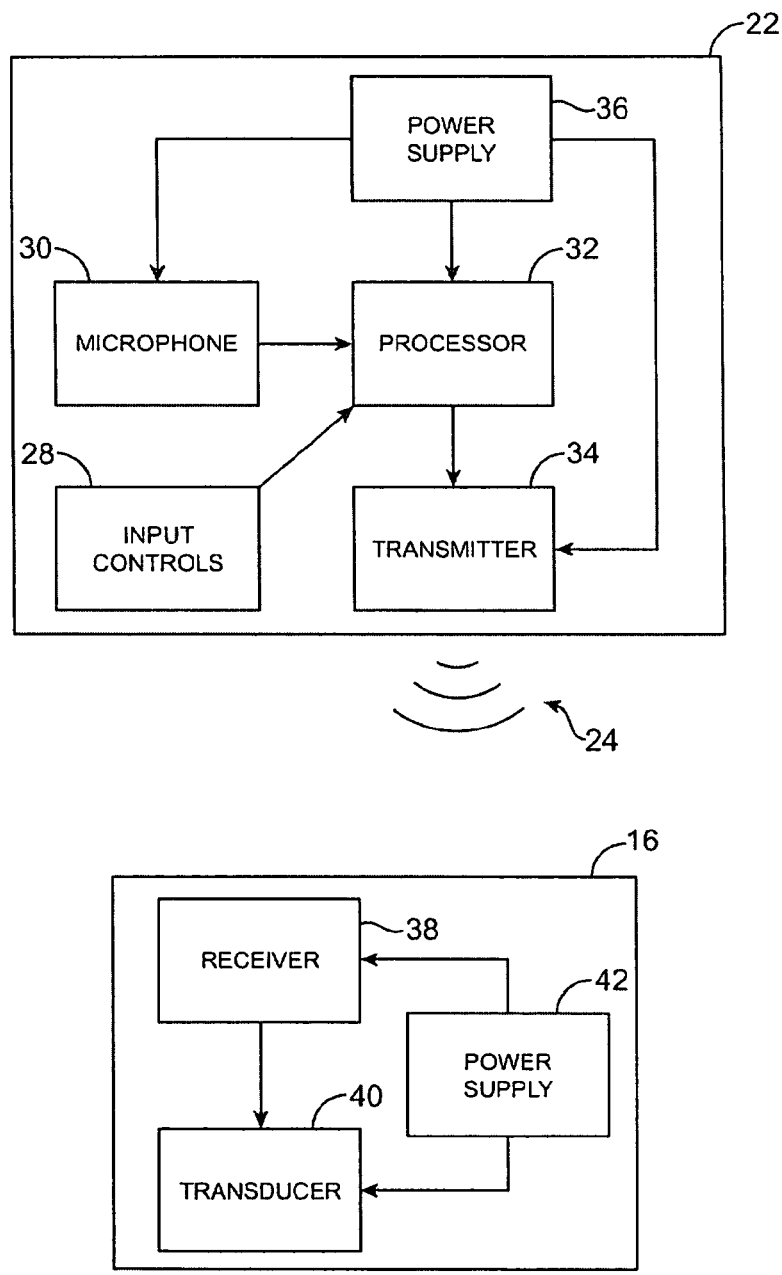
FIG. 4 shows an illustrative configuration of the individual components in a variation of the oral appliance device having an external transmitting assembly with a receiving and transducer assembly within the mouth.

FIG. 4 illustrates a schematic representation of one variation of hearing aid assembly 14 utilizing an extra-buccal transmitter assembly 22, which may generally comprise microphone 30 for receiving sounds and which is electrically connected to processor 32 for processing the auditory signals. Processor 32 may be connected electrically to transmitter 34 for transmitting the processed signals to the electronics and/or transducer assembly 16 disposed upon or adjacent to the user's teeth. The microphone 30 and processor 32 may be configured to detect and process auditory signals in any practicable range, but may be configured in one variation to detect auditory signals ranging from, e.g., 250 Hertz to 20,000 Hertz.

With respect to microphone 30, a variety of various microphone systems may be utilized. For instance, microphone 30 may be a digital, analog, and/or directional type microphone. Such various types of microphones may be interchangeably configured to be utilized with the assembly, if so desired.

Power supply 36 may be connected to each of the components in transmitter assembly 22 to provide power thereto. The transmitter signals 24 may be in any wireless form utilizing, e.g., radio frequency, ultrasound, microwave, Blue Tooth® (BLUETOOTH SIG, INC., Bellevue, Wash.), etc. for transmission to assembly 16. Assembly 22, may also optionally include one or more input controls 28 that a user may manipulate to adjust various acoustic parameters of the electronics and/or transducer assembly 16, such as acoustic focusing, volume control, filtration, muting, frequency optimization, sound adjustments, and tone adjustments, etc.

The signals transmitted 24 by transmitter 34 may be received by electronics and/or transducer assembly 16 via receiver 38, which may be connected to an internal processor for additional processing of the received signals. The received signals may be communicated to transducer 40, which may vibrate correspondingly against a surface of the tooth to conduct the vibratory signals through the tooth and bone and subsequently to the middle ear to facilitate hearing of the user. Transducer 40 may be, configured as any number of different vibratory mechanisms. For instance, in one variation, transducer 40 may be an electromagnetically actuated transducer. In other variations, transducer 40 may be in the form of a piezoelectric crystal having a range of vibratory frequencies, e.g., between 250 to 4000 kHz.

Power supply 42 may also be included with assembly 16 to provide power to the receiver, transducer, and/or processor, if also included. Although power supply 42 may be a simple battery, replaceable or permanent, other variations may include a power supply 42 which is charged by inductance via an external charger. Additionally, power supply 42 may alternatively be charged via direct coupling to an alternating current (AC) or direct current (DC) source. Other variations may include a power supply 42 which is charged via a mechanical mechanism, such as an internal pendulum or slidable electrical inductance charger as known in the art, which is actuated via, e.g., motions of the jaw and/or movement for translating the mechanical motion into stored electrical energy for charging power supply 42.

Figure 5:
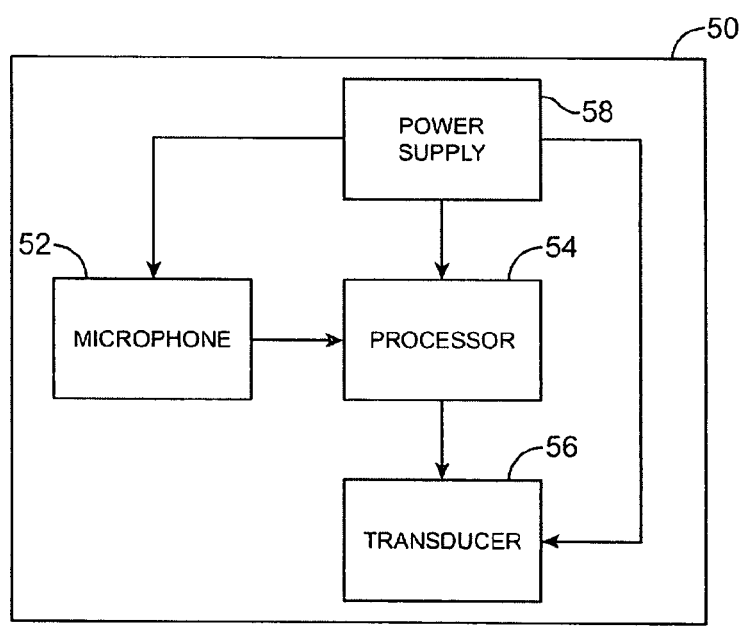
FIG. 5 shows an illustrative configuration of another variation of the device in which the entire assembly is contained by the oral appliance within the user's mouth.

In another variation of assembly 16, rather than utilizing an extra-buccal transmitter, hearing aid assembly 50 may be configured as an independent assembly contained entirely within the user's mouth as shown in FIG. 5. Accordingly, assembly 50 may include an internal microphone 52 in communication with an on-board processor 54. Internal microphone 52 may comprise any number of different types of microphones, as described above. Processor 54 nay be used to process any received auditory signals for filtering and/or amplifying the signals and transmitting them to transducer 56, which is in vibratory contact against the tooth surface. Power supply 58, as described above, may also be included within assembly 50 for providing power to each of the components of assembly 50 as necessary.

The removable oral appliance 18 may be fabricated from various polymeric or a combination of polymeric and metallic materials using any variety of methods. For instance, in one variation of fabricating an oral appliance, a three-dimensional digital scanner may be used to image the dentition of the patient, particularly the tooth or teeth TH upon or about which the oral appliance is to be positioned. The scanned image may be processed via a computer to create a three-dimensional virtual or digital model 60 of the tooth or teeth TH, as shown in FIGS. 6A and 6B.

Various three-dimensional scanning modalities may be utilized to create the three-dimensional digital model 60. For instance, intra-oral cameras or scanners using, e.g., laser, white light, ultrasound, mechanical three-dimensional touch scanners, magnetic resonance imaging (MRI), computed tomography (CT), other optical methods, etc., may be utilized.

Once the three-dimensional image has been captured, the image may then be manipulated via conventional software to create a direct three-dimensional print of the model. Alternatively, the image may be used to directly machine the model. Systems such as computer numerical control (CNC) systems or three-dimensional printing processes, e.g., stereolithography apparatus (SLA), selective laser sintering (SLS), and/or other similar processes utilizing three-dimensional geometry of the patient's dentition may be utilized.

In another alternative, a mold may be generated from the print to then allow for thermal forming of the appliance directly upon the created mold. And yet in other variations, the three-dimensional image may be used to create an injection mold for creating the appliance. Each of these processes are described in further detail below.

Once the scanned image has been processed to create a three-dimensional virtual or digital model 60 of the tooth or teeth TH, the housing 62 for the electronics/transducer assembly may be digitally imposed or created in the digital model 60. Alternatively, a physical model of the housing may be positioned upon the appropriate tooth or teeth TH and the dentition with the housing may be scanned to create the digital model 60.

In either case, the resulting digital model 60 may be utilized to create a three-dimensional virtual or digital model of the appliance 64 having the housing 62 integrated therewith, as shown in the partial cross-sectional view in FIG. 6C. The digital model of the appliance 64 may then be used to print or create the physical oral appliance 66, as shown in FIG. 6D. Accordingly, an oral appliance 66 which conforms to the patient's dentition may be formed to ensure secure contact upon or against the dentition while maintaining comfort to the user.

In another alternative method, once the three-dimensional model of the appliance 64 has been created, as shown in FIGS. 7A to 7C, oral appliance 68 may be machined directly, e.g., utilizing computer numerical control machining, from polymeric materials to create the appliance 68, as shown in FIG. 7D.

In yet another alternative, once the appropriate tooth or teeth TH has been three-dimensionally scanned and the housing 62 has been included, as shown in FIGS. 8A and 8B, a physical model of the dentition 70 may be created utilizing any of the processes above, such as three-dimensional printing, machining, etc, as shown in FIG. 8C. With the model of the dentition 70, oral appliance 72 may be thermal formed or otherwise molded about dentition 70 to create oral appliance which conforms securely and comfortably to the patient's dentition, as shown in FIG. 8D.

Another alternative is illustrated where once the three-dimensional virtual or digital model 60 has been created from the patient's dentition, as shown in FIGS. 9A and 9B, an forming mold 74 may be fabricated having an outer mold portion 76 and an inner mold portion 78 which forms a cavity or void 80 therebetween, as shown in FIG. 9C. The cavity or void 80 may be entirely filled with a settable polymer which when cured forms oral appliance 82, as shown in FIG. 9D, which may be removed from the mold portions 76, 78 to form appliance 82 which conforms securely and comfortably to the patient's dentition.

Figures 10A, 10B:
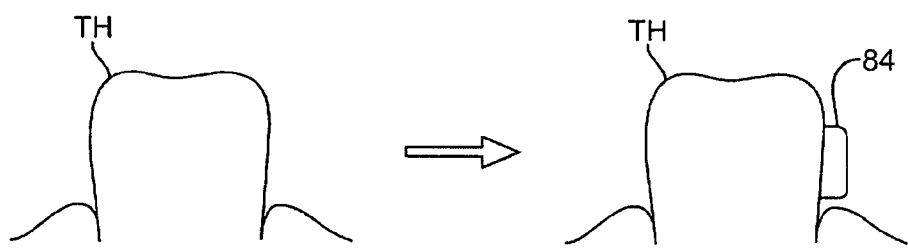
FIGS. 10A and 10B show another method in which the housing for the electronics and/or transducer assembly may be adhered directly to the patient's tooth or teeth prior to scanning.

As mentioned above, although the housing for the electronics and/or transducer assembly may be digitally created on the three-dimensional digital model generated from the patient's scanned dentition, a housing replica 84 may alternatively be adhered temporarily to a patient's tooth or teeth TH prior to scanning, the dentition, as shown in FIGS. 10A and 10B. In this manner, the three-dimensional scanner may create the digital image having the housing replica 84 already included.

Aside from digital imaging and scanning of a patient's dentition, an alternative mechanism for creating a conformable oral appliance may utilize impression molding of the appropriate dentition. One example is shown in FIGS. 11A and 11B where an impression 92 of patient's dentition may be formed by utilizing a mold 90 filled with a suitable impression material, e.g., alginate, plaster, polyvinylsiloxane, polyurethane, polyacrylate, ethylene vinyl acetate, and blends or combinations thereof, etc.

An impression of the dentition may also be formed after a replica of housing mold 84 has been affixed temporarily to the tooth or teeth TH, as shown in FIG. 12A, prior to forming an impression 94 having the housing formed therein, as shown in FIG. 12B.

In either case, once the impression 92, 94 has been formed, the mold 90 may be filled with a plaster to create a permanent, three-dimensional mold or model of the appropriate dentition, which may then be used to thermally form an oral appliance or which may be scanned digitally to utilize any of the forming or machining processes, as described above. Alternatively, the impression 92, 94 itself may be scanned to render a three-dimensional model of the appropriate dentition and/or housing for processing, also as above.

As illustrated in FIGS. 11C to 11F, mold 90 having impression 92 formed therein may be used to form the three-dimensional mold or model 95, as mentioned above and as shown in FIG. 11D. In the case of mold or model 95, an electronics and/or transducer housing 97 may be attached or adhered to the mold or model 95, as shown in FIG. 11E, and the oral appliance 98 may then be thermal formed directly thereupon resulting in the oral appliance 98 appropriately formed having a housing, as shown in FIG. 11F.

Likewise, if mold 90 has an impression 94 already having a housing formed therein, as shown in FIG. 12C, a mold or model 99 may be formed, e.g., from plaster, resulting in a three-dimensional mold or model 99, as shown in FIG. 12D. The oral appliance 98 may then be thermal formed directly, over the mold or model 99, to result in the appliance 98 of FIG. 12E.

In the case of utilizing the mold 90 to create a physical mold or model, the resulting, mold or model may alternatively be scanned to create a digital image of the dentition, as described above, rather than thermal forming directly upon the mold or model.

In another variation, the mold 90 having an impression 92 formed therein may have an electronics and/or transducer assembly 96 impressed into the mold 90, as shown in FIGS. 13A and 13B. With the assembly 96 desirably positioned, the mold material may be cured, or otherwise activated to harden, after which oral appliance 98 may be machined or formed therefrom resulting in an appliance 98 which conforms with the user's dentition, as shown in FIG. 13C.

Likewise, once an impression 94 has been formed with the housing mold included, as shown in FIG. 14A, electronics and/or transducer assembly 96 may be positioned within the appropriate mold location, as shown in FIG. 14B, and the mold 90 may be cured or otherwise activated to harden. From this hardened mold 90, oral appliance 98 may likewise be formed via machining or forming while having the assembly 96 contained therein, as shown in FIG. 14C.

Figure 15A:
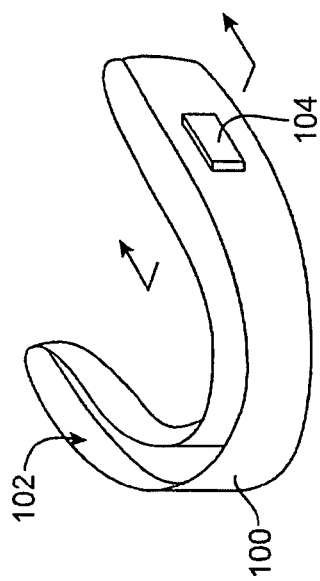
FIG. 15A shows an example of a dental tray having an electronics and/or transducer housing integrated therewith.

In yet another variation for forming or fabricating a conforming oral appliance, a dental tray 100 having a channel 102 for the user's dentition may be provided having an electronics and/or transducer housing 104 pre-formed along a lingual or buccal orientation of the dental tray 100. The example of FIG. 15A illustrates a full dental tray 100 having housing 104 located along a buccal surface of the tray 100, although partial trays may alternatively be utilized and other locations for housing 104 may also be implemented. An electronics and/or transducer assembly 106 may be pre-positioned, within housing 104 while held via one or more temporary spacers 108, as shown in the partial cross-sectional view of FIG. 15B.

Figure 15D:
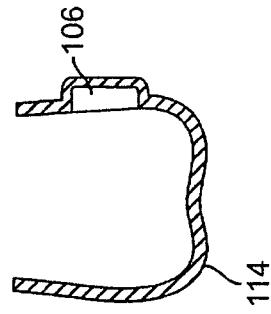
FIGS. 15B to 15D illustrate an example for utilizing the dental tray where a polymer may be conformed to the patient's dentition and hardened to create a conforming oral appliance.
Figure 15C:
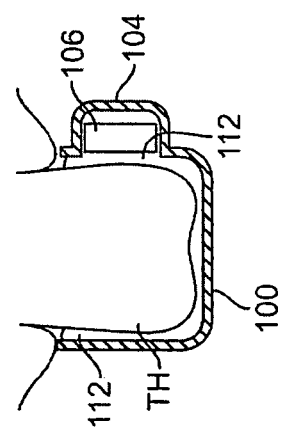
Figure 15B:
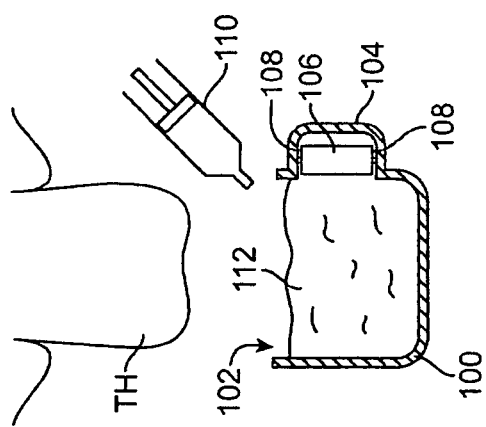

To form the oral appliance, tray 100 may be filled with any of the settable or curable materials 112 described above or may comprise a moisture-activated hydrogel utilizing, e.g., a dispenser 110, until the materials 112 fill any spaces or voids around assembly 106 to encapsulate assembly 106. The user may then place the tray 100 upon the appropriate portion of the dentition until the tooth or teeth TH is positioned sufficiently within tray 100, as shown in FIG. 15C. The tray 100 may be maintained upon the tooth or teeth TH until the material 112 has set and hardened. The tray 100 with the conforming impression may then be removed from the patient's mouth and the resulting oral appliance 114 and assembly 106 may be removed from tray 100 and trimmed or machined as appropriate, as shown in FIG. 15D. Alternatively, oral appliance 114 may be formed about the patient's dentition without assembly 106, which may be integrated, attached, or otherwise affixed, e.g., via adhesives, after oral appliance 114 has been formed.

In yet another alternative, tray 100 may comprise a preformed tray made from, e.g., ethylene vinyl acetate or polyethylene material, which may be heated or boiled to activate the tray 100. Once activated, the user may bite into tray 100 to at least partially mold or conform tray 100 to the user's dentition. Assembly 106 may be included or integrated after the tray 100 has been conformed.

In one exemplary embodiment to fabricate an oral appliance, the system first fabricates a scaffold of an oral appliance, using a rapid prototyping system called Fused Deposition Modeling (FDM). The scaffold is subsequently immersed into a resin to strengthen the scaffold. Excess resin and support material is then trimmed from the scaffold to arrive at a finished device.

FDM is one way to generate the oral appliance. In FDM, a plastic filament is unwound from a coil and supplies material to an extrusion nozzle. The nozzle is heated to melt the plastic and has a mechanism which allows the flow of the melted plastic to be controlled. The nozzle is mounted to a mechanical stage which can be moved three-dimensionally. As the nozzle is moved over the required geometry, it deposits a thin bead of extruded plastic to form each layer. The plastic hardens immediately after being squirted from the nozzle and bonds to the layer below. The entire system is contained within an oven chamber which is held at a temperature just below the melting point of the plastic. Thus, only a small amount of additional thermal energy needs to be supplied by the extrusion nozzle to cause the plastic to melt. This provides much better control of the process. Several materials are available for the process including a nylon-like polymer and both machinable and investment casting waxes. ABS plastic material can be used to provide high layer to layer bonding. Water-soluble support materials can be used and subsequently removed by washing them away. FDM machines are available from Stratasys, among others.

In another embodiment, Selective Laser Sintering (SLS) can be used. The process is similar to the SLA process. In SLS, a laser beam is traced over the surface of a tightly compacted powder made of thermoplastic material. The powder is spread by a roller over the surface of a build cylinder. A piston moves down one object layer thickness to accommodate the layer of powder. The piston moves upward incrementally to supply powder for the process. Heat from the laser melts the powder where it strikes under guidance of the scanner system. The laser used provides a concentrated infrared heating beam. The entire fabrication chamber is sealed and maintained at a temperature just below the melting point of the plastic powder. Thus, heat from the laser need only elevate the temperature slightly to cause sintering, greatly speeding the process. After the object is fully formed, the piston is raised to elevate the object. Excess powder is simply brushed away and final manual finishing may be carried out.

In yet another embodiment, a 3D printer using inkjet head can be used. In this embodiment, The method is very reminiscent of selective laser sintering, except that the laser is replaced by an inkjet head. The multi-channel jetting head deposits a liquid adhesive compound onto the top layer of a bed of powder object material. The particles of the powder become bonded in the areas where the adhesive is deposited. Once a layer is completed the piston moves down by the thickness of a layer. As in selective laser sintering, the powder supply system (E) is similar in function to the build cylinder. In this case the piston moves upward incrementally to supply powder for the process and the roller (D) spreads and compresses the powder on the top of the build cylinder. The process is repeated until the entire object is completed within the powder bed. Exemplary machines are available from Z Corp. which uses the process to create models out of starch, plaster and other types of powders.

In other embodiment, Thermal Phase Change inkjets can be used for ballistic particle manufacturing (BPM). The phase change inkjet technologies rely on squirting a build material in a liquid or melted state which cools or otherwise hardens to form a solid on impact. Exemplary systems from 3D Systems include the ThermoJet Modeler which utilizes several hundred nozzles. In a Solidscape machine uses plastic object and wax and support materials which are held in a melted liquid state at elevated temperature in reservoirs. The liquids are fed to individual jetting heads through thermally insulated tubing. The jetting heads squirt tiny droplets of the materials as they are moved side to side in the required geometry to form the layer of the object. The heads are controlled and only place droplets where they are required to. The materials harden by rapidly dropping in temperature as they are deposited. After an entire layer of the object is formed by jetting, a milling head is passed over the layer to make it a uniform thickness. Particles are vacuumed away as the milling head cuts and are captured in a filter. After the object is completed, the wax support material is either melted or dissolved away.

Another process called Photopolymer Phase Change Inkjets process is based on photopolymers, but uses a wide area inkjet head to layerwise deposit both build and support materials. It subsequently completely cures each, layer after it is deposited with a UV flood lamp mounted on the printhead. The support material, which is also a photopolymer, is removed by washing it away with pressurized water in a secondary operation.

In another embodiment, in lieu of the scaffold, a blank can be used in making a direct-formed mouthguard. The blank includes a material conformable to a contours of a user's intra-oral structures at a predetermined temperature range when the blank is subjected to bite pressure and an electronic and/or transducer assembly mounted on the material to couple to at least a portion of a patient's dentition. The transducer and/or electronics, can be inserted into the material before or after the blank is subjected to bite pressure.

The blank provides a direct-formed thermoplastic mouthguard in which a stock plastic mouthguard is softened in hot water, placed in the users mouth and formed by the application of bite pressure, or a ready-made stock mouthguard used without the need for any fitting. The blank can be low in cost and thus can be sold at retail outlets.

In one implementation, the blank can be an inner layer of settable thermoplastic material conformable to the contours of the user's intra-oral structures at a predetermined temperature range when said blank is subjected to bite pressure; a core layer of rigid, force-transmitting thermoplastic material disposed adjacent to and coextensively with the inner layer and having a softening temperature higher than the pre-determined temperature range. The core layer is conformable to the general shape of the user's upper or lower row of teeth at said softening temperature to adjust the overall fit of the blank. An outer layer of settable, shock-absorbing thermoplastic material is disposed adjacent to and coextensively with the core layer. The outer layer is conformable to the contours of a user's intra-oral structures at a predetermined temperature range when the blank is subjected to bite pressure. The electronics and/or the transducer can be placed inside the blank prior to use.

The applications of the devices and methods discussed above are not limited to the treatment of hearing loss but may include any number of further treatment applications. Moreover, such devices and methods may be applied to other treatment sites within the body. Modification of the above-described assemblies and methods for carrying out the invention, combinations between different variations as practicable, and variations of aspects of the invention that are obvious to those of skill in the art are intended to be within the scope of the claims.

What is claimed is:

1. A method for fabricating an oral appliance for maintaining an electronics and/or transducer assembly against at least a portion of a patient's dentition, comprising:
   scanning at least the portion of dentition such that a corresponding three-dimensional image is created;
   manipulating the image such that a housing is formed to have a tooth engaging channel for removable placement upon a lingual and an apposed buccal surface of the dentition and where a housing sized for the transducer is positioned along the buccal surface of the portion of dentition; and
   forming the oral appliance having the housing portion from the image whereby the oral appliance is conformable to the portion of dentition and where the transducer is securable to the buccal surface via the housing.

2. The method of claim 1 wherein scanning comprises scanning via an imaging modality selected from the group consisting of laser, white light, ultrasound, mechanical three-dimensional touch scanners, magnetic resonance imaging, and computed tomography.

3. The method of claim 1 wherein scanning comprises scanning via an intra-oral digital camera.

4. The method of claim 1 wherein scanning comprises generating a corresponding three-dimensional digital image.

5. The method of claim 1 wherein manipulating comprises digitally adding via a computer the housing sized for the electronics and/or transducer assembly.

6. The method of claim 1 wherein forming comprises creating the oral appliance corresponding to the image via a process selected from the group consisting of machining, computer numerical control machining, stereolithography apparatus, and selective laser sintering.

7. The method of claim 6 wherein creating comprises forming a positive mold corresponding to the oral appliance having the housing portion.

8. The method of claim 7 further comprising thermal forming the oral appliance over the positive mold.

9. A method for fabricating an oral appliance for maintaining an electronics and/or transducer assembly against at least a portion of a patient's dentition, comprising:
   obtaining an impression of at least the portion of dentition;
   scanning the impression such that a corresponding three-dimensional image is created;
   manipulating the image such that a housing is formed to have a tooth engaging channel for removable placement upon a lingual and an apposed buccal surface of the dentition and where the housing is sized for placement of the transducer along the buccal surface of the portion of dentition; and
   forming the oral appliance having the housing portion from the image whereby the oral appliance is conformable to the portion of dentition and where the transducer is securable to the buccal surface via the housing.

10. The method of claim 9 wherein obtaining an impression comprises impressing a mold upon the portion of dentition.

11. The method of claim 9 wherein scanning comprises scanning via an imaging modality selected from the group consisting of laser, white light, ultrasound, mechanical three-dimensional touch scanners, magnetic resonance imaging, and computed tomography.

12. The method of claim 9 wherein scanning comprises scanning via an intra-oral digital camera.

13. The method of claim 9 wherein scanning comprises generating a corresponding three-dimensional digital image.

14. The method of claim 9 wherein manipulating comprises digitally adding via a computer a housing sized for the electronics and/or transducer assembly.

15. The method of claim 9 wherein forming comprises creating the oral appliance corresponding to the image via a process selected from the group consisting of machining, computer numerical control machining, stereolithography apparatus, and selective laser sintering.

16. The method of claim 15 wherein creating comprises forming a positive mold corresponding to the oral appliance.

17. The method of claim 16 further comprising thermal forming the oral appliance over the positive mold.

* * * * *